United States Patent
Nagy et al.

(10) Patent No.: US 10,579,055 B2
(45) Date of Patent: Mar. 3, 2020

(54) DRIVE STATE INDICATOR FOR AN AUTONOMOUS VEHICLE

(71) Applicant: Robert Bosch GmbH, Stuttgart (DE)

(72) Inventors: Akos Nagy, Mountain View, CA (US); Jan Becker, Palo Alto, CA (US)

(73) Assignee: Robert Bosch GmbH, Stuttgart (DE)

( * ) Notice: Subject to any disclaimer, the term of this patent is extended or adjusted under 35 U.S.C. 154(b) by 196 days.

(21) Appl. No.: 15/540,340

(22) PCT Filed: Dec. 29, 2015

(86) PCT No.: PCT/US2015/067788
§ 371 (c)(1),
(2) Date: Jun. 28, 2017

(87) PCT Pub. No.: WO2016/109482
PCT Pub. Date: Jul. 7, 2016

(65) Prior Publication Data
US 2017/0371334 A1    Dec. 28, 2017

Related U.S. Application Data

(60) Provisional application No. 62/097,365, filed on Dec. 29, 2014.

(51) Int. Cl.
*G05D 1/00* (2006.01)
*B60W 50/14* (2012.01)

(52) U.S. Cl.
CPC .......... *G05D 1/0061* (2013.01); *B60W 50/14* (2013.01); *B60W 2050/143* (2013.01); *G05D 2201/0213* (2013.01)

(58) Field of Classification Search
CPC ........ G05D 1/0061; G05D 2201/0213; B60W 50/14; B60W 2050/143
See application file for complete search history.

(56) References Cited

U.S. PATENT DOCUMENTS 6,226,570 B1    5/2001    Hahn
6,658,339 B1    12/2003   Wright et al.
(Continued)

FOREIGN PATENT DOCUMENTS

DE    102006058413 A1    6/2008

OTHER PUBLICATIONS

International Search Report and Written Opinion for Application No. PCT/US2015/067788 dated Apr. 19, 2016, (13 pages).

*Primary Examiner* — Nga X Nguyen
(74) *Attorney, Agent, or Firm* — Michael Best & Friedrich LLP

(57) ABSTRACT

A system and method for indicating the drive state of an autonomous vehicle. The system includes a human machine interface and an electronic controller electrically coupled to the human machine interface and which is configured to display a drive state indicator. The drive state indicator includes a mode indicator based on a current operating mode for the autonomous vehicle, a duration indicator based on a duration for the current operating mode and a descriptor based on the duration. The electronic controller is further configured to update the duration indicator and the descriptor based on a remainder of the duration. In an alternative embodiment, the electronic controller is further configured to determine whether a second operating mode is available and display a second mode indicator based on the second operating mode when a second operating mode is available.

15 Claims, 6 Drawing Sheets

(56) References Cited

U.S. PATENT DOCUMENTS

| | | | |
|---|---|---|---|
| 8,260,482 B1* | 9/2012 | Szybalski | B62D 1/286 |
| | | | 701/23 |
| 9,594,373 B2* | 3/2017 | Solyom | G05D 1/0212 |
| 2007/0208468 A1 | 9/2007 | Sankaran et al. | |
| 2009/0312917 A1 | 12/2009 | Zawade et al. | |
| 2012/0310515 A1 | 12/2012 | Kirshon et al. | |
| 2014/0149909 A1 | 5/2014 | Montes | |

* cited by examiner

DRIVE STATE INDICATOR FOR AN AUTONOMOUS VEHICLE

RELATED APPLICATIONS

This application claims the benefit of U.S. Provisional Application No. 62/097,365, filed Dec. 29, 2014, the entire contents of which are incorporated herein by reference.

FIELD

Embodiments of the invention relate to the field of automotive control systems.

BACKGROUND

Driver assistance systems such as, for example, adaptive cruise control and automated lane change systems have been successfully deployed to the market to increase of driver comfort and safety. As these driver assistance systems progress in sophistication, less driver interaction may be required. In some cases, the driver assistance systems may be fully automated for portions of a trip. Accordingly, the role of the driver has changed from that of an active driver to that of a passenger, for at least some portion of the trip. Highly automated vehicles allow the driver to hand over control to the automated vehicle and to do other tasks while driving.

SUMMARY

One exemplary embodiment provides a system for indicating the state of an autonomous vehicle. The system includes a human machine interface and an electronic controller that is electrically coupled to the human machine interface. The electronic controller is configured to display via the human machine interface a drive state indicator. The drive state indicator includes a mode indicator based on a current operating mode for the autonomous vehicle. The drive state indicator further includes a duration indicator based on a duration for the current operating mode. The drive state indicator further includes a descriptor based on the duration. The electronic controller is further configured to update the duration indicator and the descriptor based on a remainder of the duration. In an alternative embodiment, the electronic controller is further configured to determine whether a second operating mode is available and display a second mode indicator based on the second operating mode when a second operating mode is available.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using any known means including wired connections, wireless connections, etc.

It should also be noted that a plurality of hardware and software based devices, as well as a plurality of different structural components may be utilized to implement the invention. It should also be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processors. As such, it should be noted that a plurality of hardware and software based devices, as well as a plurality of different structural components may be utilized to implement the invention. For example, "control units" and "controllers" described in the specification can include one or more processors, one or more memory modules including non-transitory computer-readable medium, one or more input/output interfaces, and various connections (e.g., a system bus) connecting the components.

Figure 1:
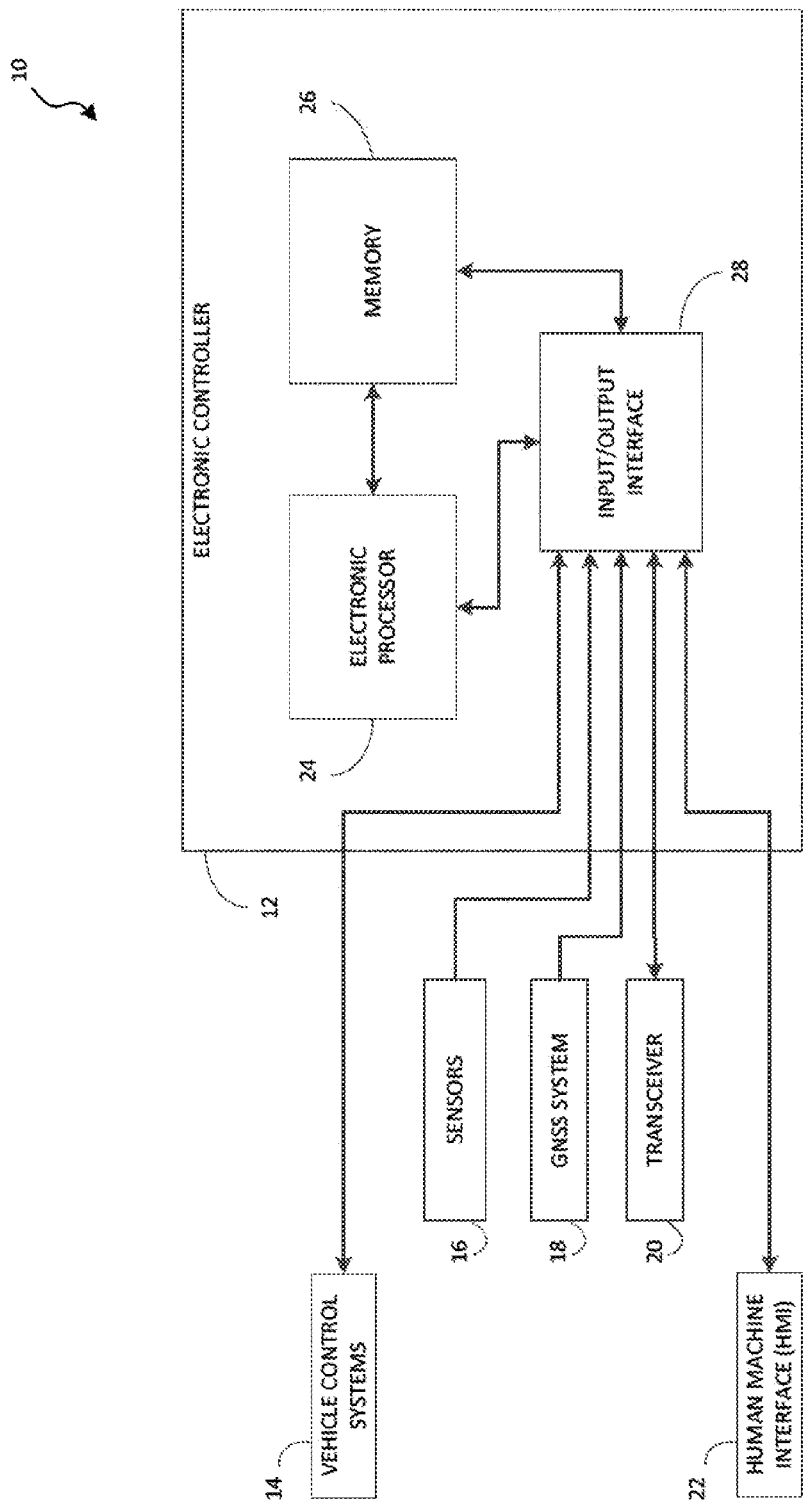
FIG. 1 is a block diagram of an autonomous vehicle control system in accordance with some embodiments.

FIG. 1 is a block diagram of one exemplary embodiment of an autonomous vehicle control system 10. As described more particularly below, the autonomous vehicle control system 10 may be mounted on, or integrated into, a vehicle (not shown) and autonomously drives the vehicle. It should be noted that, in the description that follows, the terms "autonomous vehicle" and "automated vehicle" should not be considered limiting. The terms are used in a general way to refer to an autonomous or automated driving vehicle, which possesses varying degrees of automation (i.e., the vehicle is configured to drive itself with limited, or in some cases no, input from a driver). The systems and methods described herein may be used with any vehicle capable of operating partially or fully autonomously, being controlled manually by a driver, or some combination of both.

The term "driver," as used herein, generally refers to an occupant of an autonomous vehicle who is seated in the driver's position, operates the controls of the vehicle while in a manual mode, or provides control input to the vehicle to influence the autonomous operation of the vehicle. The term "passenger," as used herein, generally refers to an occupant of an autonomous vehicle who passively rides in the vehicle without controlling the driving operations of the vehicle. However, both the driver and passenger of an autonomous vehicle may share some of the other's role. For example, the driver may hand over the driving controls to the autonomous vehicle control system 10 and ride in the vehicle as a passenger for some or all of a trip.

The term "trip," as used herein, refers to the driving (manually or autonomously) of a vehicle from a starting point to a final destination point, with or without one or more waypoints in between. For example, a trip may start at a driver's home (i.e., the starting point), include a stop to pick up a passenger at the passenger's home (i.e., a waypoint), and continue to the workplace of the driver and the passenger (i.e., the destination).

In the example illustrated, the autonomous vehicle control system 10 includes an electronic controller 12, vehicle control systems 14, sensors 16, a GNSS system 18, a transceiver 20, and a human machine interface (HMI) 22. The components of the autonomous vehicle control system 10, along with other various modules and components are electrically coupled to each other by or through one or more control or data buses, which enable communication therebetween. The use of control and data buses for the interconnection between, and communication among, the various modules and components would be known to a person skilled in the art in view of the invention described herein. In alternative embodiments, some or all of the components of the autonomous vehicle control system 10 may be communicatively coupled using suitable wireless modalities (for example, Bluetooth™ or near field communication). For ease of description, the autonomous vehicle control system 10 illustrated in FIG. 1 includes one of each of the foregoing components. Alternative embodiments may include one or more of each component, or may exclude or combine some components. The electronic controller 12 controls the vehicle control systems 14, sensors 16, GNSS system 18, transceiver 20, human machine interface (HMI) 22, to autonomously control the vehicle according to the methods described herein. In some embodiments, the electronic controller 12 controls the vehicle control systems 14, sensors 16, GNSS system 18, transceiver 20, human machine interface 22 by transmitting control signals or instructions to these devices and systems.

The electronic controller 12 includes an electronic processor 24 (e.g., a microprocessor, application specific integrated circuit, etc.), a memory 26, and an input/output interface 28. The memory 26 may be made up of one or more non-transitory computer-readable media, and includes at least a program storage area and a data storage area. The program storage area and the data storage area can include combinations of different types of memory, such as read-only memory ("ROM"), random access memory ("RAM") (e.g., dynamic RAM ("DRAM"), synchronous DRAM ("SDRAM"), etc.), electrically erasable programmable read-only memory ("EEPROM"), flash memory, a hard disk, an SD card, or other suitable magnetic, optical, physical, or electronic memory devices. The electronic processor 24 is coupled to the memory 26 and the input/output interface 28. The electronic processor 24 sends and receives information (e.g., from the memory 26 and/or the input/output interface 28), and processes the information by executing one or more software instructions or modules, capable of being stored in the memory 26, or another non-transitory computer readable medium. The software can include firmware, one or more applications, program data, filters, rules, one or more program modules, and other executable instructions. The electronic processor 24 is configured to retrieve from the memory 26 and execute, among other things, software for autonomous vehicle control, and for performing methods as described herein.

The input/output interface 28 transmits and receives information from devices external to the electronic controller 12 (e.g., over one or more wired and/or wireless connections), such as the vehicle control systems 14, the sensors 16, the GNSS system 18, the transceiver 20, and the HMI 22. The input/output interface 38 receives user input, provides system output, or a combination of both. As described herein, user input from a driver or passenger of a vehicle may be provided via, for example, the HMI 22. The input/output interface 38 may also include other input and output mechanisms, which for brevity are not described herein and which may be implemented in hardware, software, or a combination of both.

It should be understood that although FIG. 1 illustrates only a single electronic processor 24, memory 26, and input/output interface 28, alternative embodiments of the electronic controller 12 may include multiple processing units, memory modules, and/or input/output interfaces. It should also be noted that the autonomous vehicle control system 10 may include other electronic controllers, each including similar components as, and configured similarly to, the electronic controller 12. In some embodiments, the electronic controller 12 is implemented partially or entirely on a semiconductor (e.g., a field-programmable gate array ["FPGA"] semiconductor) chip. Similarly, the various modules and controllers described herein may be implemented as individual controllers, as illustrated, or as components of a single controller. In some embodiments, a combination of approaches may be used.

The electronic processor 24 uses the input/output interface 28 to send and receive information or commands to and from the vehicle control systems 14 (e.g., over a vehicle communication bus, such as a CAN bus). The vehicle control systems 14 include components (e.g., actuators, motors, and controllers) to control a plurality of vehicle systems (e.g., braking, steering, and engine power output). For the sake of brevity, the vehicle control systems 14 will not be described in greater detail. The electronic processor 24 is configured to operate the vehicle control systems 14 to autonomously drive the vehicle. In some embodiments, the vehicle control systems 14 are controlled to automatically drive the vehicle without driver intervention or input for the entirety of a trip. In other embodiments, the vehicle control systems 14 are controlled to drive the vehicle for one or more portions of a trip, and to allow or require a driver to manually operate the vehicle for one or more portions of the trip.

The sensors 16 are coupled to the electronic controller 12 and determine one or more attributes of the vehicle and communicate information regarding those attributes to the electronic controller 12 using, for example, electrical signals. The vehicle attributes include, for example, the position of the vehicle or portions or components of the vehicle, the movement of the vehicle or portions or components of the vehicle, the forces acting on the vehicle or portions or components of the vehicle, and the proximity of the vehicle to other vehicles or objects (stationary or moving). The sensors 16 may include, for example, vehicle control sensors (e.g., sensors that detect accelerator pedal position, brake pedal position, and steering wheel position [steering angle]), wheel speed sensors, vehicle speed sensors, yaw sensors, force sensors, odometry sensors, and vehicle proximity sensors (e.g., camera, radar, ultrasonic). The electronic controller 12 receives and interprets the signals received from the sensors to determine values for one or more vehicle attributes, including, for example, vehicle speed, steering angle, vehicle position, pitch, yaw, and roll. The electronic controller 12 controls the vehicle control systems 14 to autonomously control the vehicle (for example, by generating braking signals, acceleration signals, steering signals) based at least in part on the information received from the sensors 16. Some of the sensors 16 may be integrated into the vehicle control systems 14, while others may be deployed on the vehicle separately from the vehicle control systems 14.

The GNSS (global navigation satellite system) system 18 receives radiofrequency signals from orbiting satellites using one or more antennas and receivers (not shown). The GNSS system 18 determines geo-spatial positioning (i.e., latitude, longitude, altitude, and speed) for the vehicle based on the received radiofrequency signals. The GNSS system 18 communicates this positioning information to the electronic controller 12. The electronic controller 12 may use this information in conjunction with, or in place of, information received from the sensors 16 when controlling the autonomous vehicle 11. The electronic controller 12 controls the GNSS system 18 to plan routes and navigate the autonomous vehicle 11. GNSS systems are known, and will not be described in greater detail. Alternative embodiments may use a regional satellite navigation system, and/or a land-based navigation system in conjunction with, or in place of, the GNSS system 18. In some embodiments, the GNSS system 18 may operate using the GPS (global positioning system).

The transceiver 20 is a radio transceiver communicating data over one or more wireless communications networks, such as, for example, cellular networks and land mobile radio networks. The transceiver 20 includes other components that enable wireless communication, which for brevity are not described herein and which may be implemented in hardware, software, or a combination of both. In some embodiments, the transceiver 20 communicatively couples the electronic controller 12 with private or public data networks (e.g., the Internet). In some embodiments, the transceiver 20 also operates to provide wireless communications within the vehicle using suitable network modalities (e.g., Bluetooth™, near field communication, Wi-Fi™, and the like). Accordingly, portable electronic devices may communicatively couple to, and communicate with, the electronic controller 12 and other components of the autonomous vehicle control system 10.

The human machine interface (HMI) 22 provides an interface between the autonomous vehicle control system 10 and the driver. The HMI 22 is electrically coupled to the electronic controller 12 and receives input from the driver, receive information from the electronic controller 12, and provides feedback (e.g., audio, visual, haptic, or a combination thereof) to the driver based on the received information. The HMI 22 provides suitable input methods such as a button, a touch-screen display having menu options, voice recognition, etc. for providing inputs from the driver that may be used by the electronic controller 12 as it controls the vehicle.

The HMI 22 is provides visual output such as, for example, graphical indicators (i.e., fixed or animated icons), lights, colors, text, images, combinations of the foregoing, and the like. The HMI 22 includes a suitable display mechanism for displaying the visual output, for example, an instrument cluster, a mirror, a heads-up display, a center console display screen (for example, a liquid crystal display (LCD) touch screen, or an organic light-emitting diode (OLED) touch screen), or through other suitable mechanisms. In alterative embodiments, the display screen may not be a touch screen. In some embodiments, the HMI 22 includes a graphical user interface (GUI) (for example, generated by the electronic processor 24, from instructions and data stored in the memory 26, and presented on the display screen) that enables a user to interact with the autonomous vehicle control system 10. The HMI 22 may also provide audio output to the driver such as a chime, buzzer, voice output, or other suitable sound through a speaker included in the HMI 22 or separate from the HMI 22. In some embodiments, HMI 22 is configured to provide haptic outputs to the driver by vibrating one or more vehicle components (e.g., the vehicle's steering wheel and the driver's seat), such as through the use of a vibration motor. In some embodiments, HMI 22 provides a combination of visual, audio, and haptic outputs. In some embodiments, the HMI 22 causes the visual, audio, and haptic outputs to be produced by a smart phone, smart tablet, smart watch, or any other portable or wearable electronic device communicatively coupled to the vehicle, for example, via the transceiver 20.

Figure 2A:
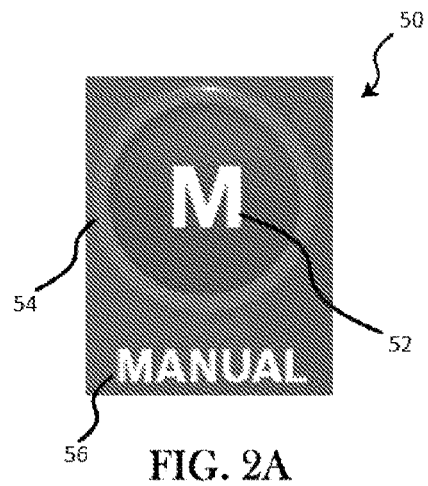
FIGS. 2A-2D illustrate exemplary drive state indicators displayed by a human machine interface in accordance with some embodiments.

FIG. 2A illustrates an exemplary embodiment of a drive state indicator 50, which may be generated and displayed by the electronic controller 12 using the HMI 22. As described in greater detail below, the drive state indicator 50 may be used by the electronic controller 12 to indicate the drive state of the autonomous vehicle. The drive state is based on at least the current operating mode (e.g., manual driving or autonomous driving) of the autonomous vehicle, the time or distance remaining for the current operating mode, the time or distance remaining until an operating mode can be activated, and the next available operating mode. The drive state indicator 50 includes a mode indicator 52, a duration indicator 54, and a descriptor 56. Alternative embodiments of the drive state indicator 50 include alternative shapes and placements of the mode indicator 52, the duration indicator 54, and the descriptor 56.

Figure 2B:
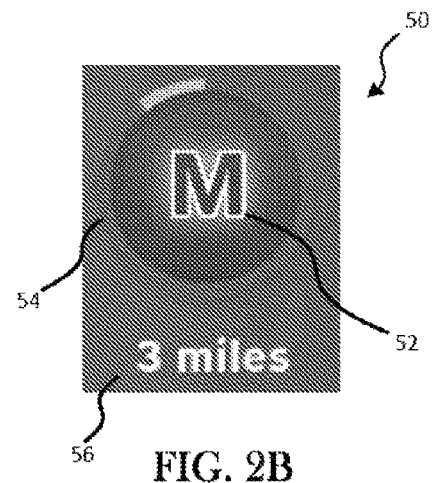

The mode indicator 52 is graphical element, for example, in the shape of a letter, used to indicate a mode of the autonomous vehicle control system 10. For example, a solid letter 'M' man indicate manual mode (i.e., driven by the driver using a steering wheel, pedals, and the like), and a solid letter 'A' may indicate autonomous mode (i.e., the autonomous vehicle control system 10 is driving the vehicle). In some embodiments, the mode indicator 52 may display an outlined letter to indicate that a mode is available, but not yet activated. For example, in FIG. 2B an outlined letter 'M' is used to indicate to the driver that manual mode is available, should the driver choose to activate it. In some embodiments, the mode indicator 52 may alternate between a solid letter and an outlined letter to indicate to the driver the active mode and the available more. For example, if the vehicle were in autonomous mode and manual mode were available, the mode indicator 52 would alternate between a solid letter 'A' and an outlined letter 'M'. In some embodiments, the vehicle's mode is also displayed using color. For example, the mode indicator 52, the duration indicator 54, and the descriptor 56 may be displayed in a first color to indicate manual driving mode, and in a second color to indicate autonomous driving mode. In other embodiments, the mode indicator 52 may display a graphical element that is not a letter, or some combination of letters and other graphical elements to indicate the current or available driving modes.

As noted above, the vehicle may be operated in manual mode for one or more portions of a trip, and the vehicle may be autonomously operated for one or more portions of the trip. Returning to FIG. 2A, the duration indicator 54 is used to indicate the duration of a portion of a trip (i.e., how much longer it is scheduled to last). The duration indicator 54 therefore also indicates the duration of the current operating mode for the vehicle. The duration of the current operating mode may be determined by the electronic controller 12 based on a route or trip entered into the autonomous vehicle control system 10 by a driver using, for example, the GNSS system 18, the HMI 22, or another suitable means. As described in detail below, the duration may be indicated in units of time or distance. In some embodiments, the electronic controller 12 automatically determines whether to display duration in time or distance, based at least on traffic conditions, road conditions, weather conditions, driver preference, or some combination thereof. For example, because the distance remaining is not dependent on vehicle speed, distance may be used when traffic is heavy, or in other situations where vehicle speed may vary. In another example, time may be used when traffic is light and the vehicle is more likely to travel at posted speeds.

Figure 2C:
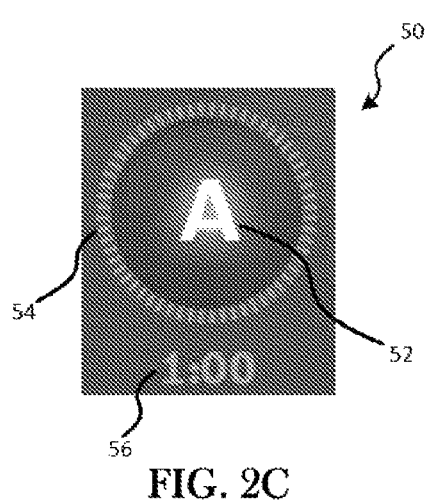
Figure 2D:
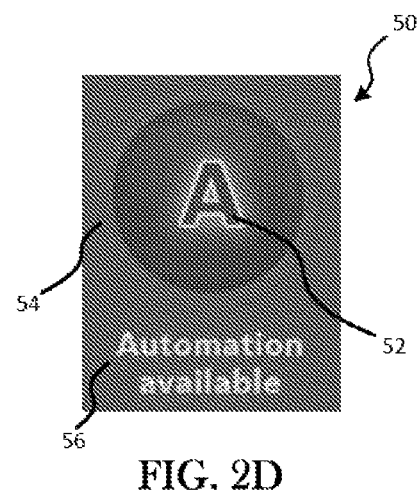

In the illustrated embodiment, the duration indicator 54 is a circular progress indicator bar, surrounding the mode indicator 52. The whole of the duration indicator 54 represents the scheduled duration for the current portion of the trip (i.e., the current operating mode). The duration indicator 54 is updated based on a remainder of the duration for the current operating mode (i.e., how much longer it is scheduled to last). In the illustrated embodiment, the duration indicator 54 is updated by decreasing the progress bar proportionally to the decrease in duration, thereby indicating the remainder of the duration left for the current operating mode. In some embodiments, the duration indicator 54 may change form to indicate a change in duration based on a pre-determined threshold. For example, as illustrated in FIG. 2C, when one minute remains in autonomous driving mode, the duration indicator 54 may change from a solid circular progress bar to sixty individual hash marks arranged in a circular pattern within the duration indicator 54. As the remaining sixty seconds count down, the individual hash marks are removed from the duration indicator 54. In some embodiments, the remaining duration may also be indicated using color. For example, the mode indicator 52, the duration indicator 54, the descriptor 56, or some combination of the foregoing may be displayed in a third color to indicate the duration of autonomous driving mode has fallen below a threshold, and in a fourth color to indicate that autonomous driving mode has fallen below a second threshold. In some embodiments, the mode indicator 52 includes a glowing and/or flashing light emanating from the letter, to indicate that that a mode duration is nearly over (see FIGS. 2B, 2C, and 2D).

Returning to FIG. 2A, the descriptor 56 is a graphical element displaying a text-based message including information about the mode, the duration, and the like. For, example, the descriptor 56 may display an indication of the active mode (see FIG. 2A), an indication of remainder of the duration (see FIGS. 2B and 2C), an indication that a mode is available (FIG. 2D), or an indication that a mode is activating. In some embodiments, the descriptor 56 alternates or scrolls to display multiple messages.

Figure 3:
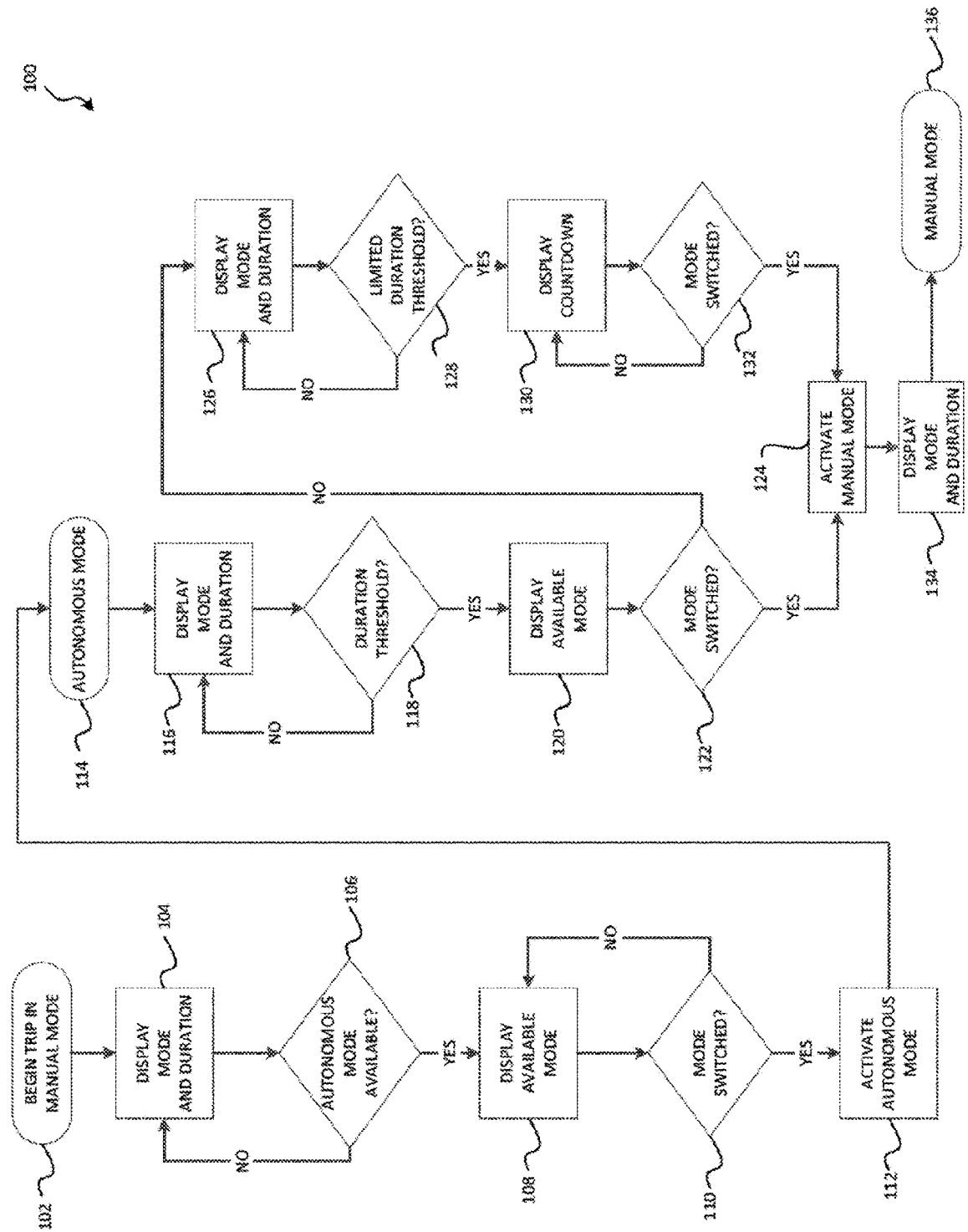
FIG. 3 is a flowchart for operating the autonomous vehicle control system of FIG. 1 in accordance with some embodiments.

As noted above, autonomous vehicles will allow the driver to either manually control the vehicle, or be driven as a passenger (e.g., in autonomous driving mode) for one or more portions of a trip. Accordingly, FIG. 3 illustrates an exemplary method 100 for operating the autonomous vehicle control system 10 during such mixed-mode trips. As an example, the method 100 is described in terms of a driver commuting from home to a workplace. In this example, the vehicle is in manual mode for the first portion of the trip (e.g., from the driver's home to a freeway; the vehicle is in autonomous mode for the second portion of the trip, on the freeway; and the vehicle enters manual mode again for the final portion of the trip, from the freeway exit to the driver's workplace. This should not be considered limiting. Skilled artisans will appreciate that the concepts embodied in the example described may be applied to any trip in which at least one transition between autonomous driving mode and manual driving mode (or vice versa) is made.

Before the trip begins, the driver of the vehicle inputs information describing the trip, including the destination, route, and preferences for manual or autonomous mode for portions of the trip into the electronic controller 12 using, for example, the GNSS system 18 and the HMI 22. In some embodiments, the electronic controller 12 is configured to use the GNSS system 18 to automatically plan the trip (given a starting point and a destination) and choose either manual or autonomous mode for portions of the trip based on, for example, the type of roads involved, traffic conditions, user preferences, and the like.

Upon initial startup, the vehicle may be in manual mode, in which the driver may operate the vehicle similarly to a conventional non-autonomous vehicle, or autonomous mode, awaiting instructions from the driver to begin operating. When the vehicle is in manual mode outside of a trip, the electronic controller 12 controls the HMI 22 to display the drive state indicator 50 as illustrated in 4A. The mode indicator 52 displays a solid letter 'M', and the descriptor 56 indicates 'MANUAL' mode is active. The duration indicator 54 is blank, because a trip has not begun or no trip has been planned. It should be noted that, in the examples described herein, the drive state indicator 50 is animated and continuously updated as the indicated durations change over the course of a trip.

Figure 4A:
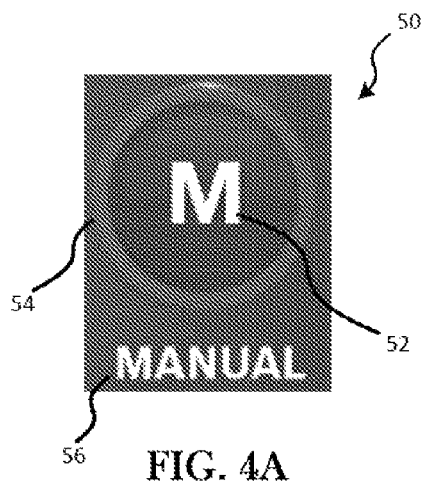
FIGS. 4A-4N illustrate exemplary drive state indicators generated using the method of FIG. 3 in accordance with some embodiments.
Figure 4B:
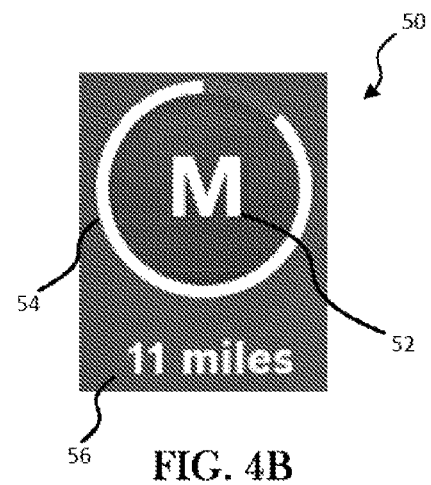

Returning to FIG. 3, at block 102, the trip begins with the vehicle operating in manual mode. When in a manual portion of a trip, the electronic controller 12 controls the HMI 22 to display the mode and duration for the mode, using the drive state indicator 50, at block 104 (see FIG. 4B). The mode indicator 52 displays a solid letter 'M' to indicate that the vehicle is in manual mode. The descriptor 56 shows the duration as distance remaining until the driver reaches the point where he is able to give the control to the vehicle and enter autonomous mode. Similarly, the duration indicator 54 graphically represents the duration as a circular progress bar, which updates based on the remainder of the distance. In some embodiments, the mode indicator 52, the duration indicator 54, and the descriptor 56 may be displayed in a first color (e.g., white) to indicate manual driving mode.

At block 106, the electronic controller 12 determines whether autonomous mode is available. In the example illustrated, the electronic controller 12 determines that autonomous mode is available when the vehicle is approaching an autonomous portion of the trip. In alternative embodiments, the electronic controller 12 may be configured to determine that autonomous driving mode is available after a predetermined duration (in distance or time) of manual mode usage has elapsed, based on traffic conditions, based on weather conditions, or based on some other thresholds or criteria, as determined either by the driver or automatically by the electronic controller 12.

Figure 4C:
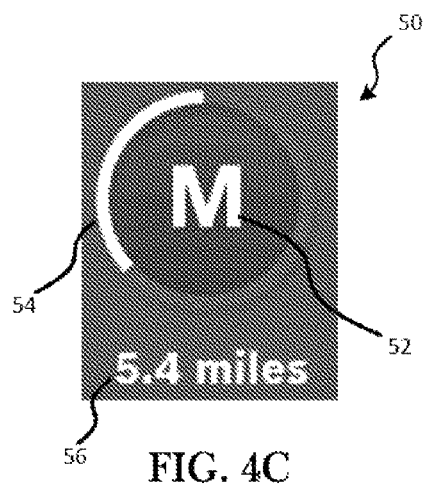

When autonomous mode is not available, the electronic controller 12 controls the HMI 22 to continue to display the mode and duration, at block 104. For example, the mode indicator 52 continues to display a solid letter 'M' to indicate that the vehicle is in manual mode (see FIG. 4C). The duration indicator 54 continues to update based on the remainder of the distance, and the descriptor 56 displays a message including the remaining distance (e.g., as illustrated, '5.4 miles').

Figure 4D:
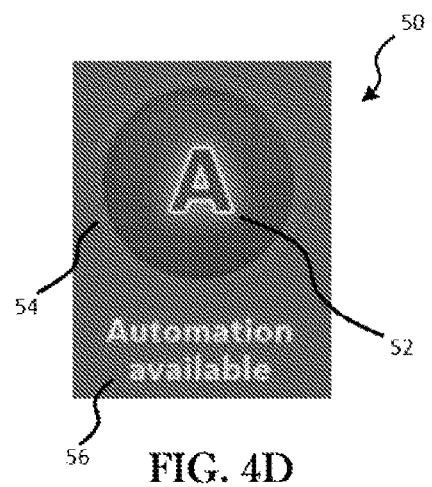

When autonomous mode is available, the electronic controller 12 controls the HMI 22 to display the available mode, at block 108. For example, the mode indicator 52 is changed to display a letter 'A' in outline form to indicate that autonomous mode is available to the driver (see FIG. 4D). In the illustrated example, the mode indicator 52 is displayed with a glowing light emanating from the letter 'A' to further highlight that autonomous mode is available. Some embodiments may include a flashing or pulsating light in the mode indicator 52, or may omit this light. The duration indicator 54 is blank, because the availability, and not the duration, of a mode is currently displayed in the drive state indicator 50. The descriptor 56 displays a message further indicating that autonomous mode is available to the driver (e.g., as illustrated, 'Automation available'). In embodiments where color is also used to indicate the driving mode, the mode indicator 52, the duration indicator 54, the descriptor 56, or some combination of the foregoing may be changed from the first color to a second color (e.g., blue), which is used to indicate the autonomous driving mode, to further highlight the availability of the autonomous mode.

Figure 4E:
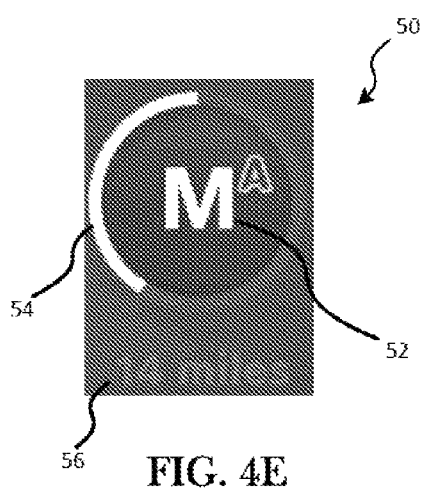

At block 110, the electronic controller 12 determines whether a mode switch has been requested by the driver. For example, electronic controller 12, via the HMI 22, may receive an input from the driver confirming that the driver would like to enter autonomous mode. When no input is received, the electronic controller 12 controls the HMI 22 to continue displaying the available mode along with the current operating mode (see FIG. 4E). For example, the mode indicator 52 includes a solid letter 'M' to indicate that the vehicle is in manual mode and a superscripted outlined letter 'A' to indicate that autonomous mode is available. The duration indicator 54 indicates the remaining distance in the current manual portion of the trip, and updates based on the remaining distance. The descriptor 56 displays a message including the remaining distance should the driver remain in manual mode for the autonomous portion of the trip (e.g., as illustrated, '14 miles').

Figure 4F:
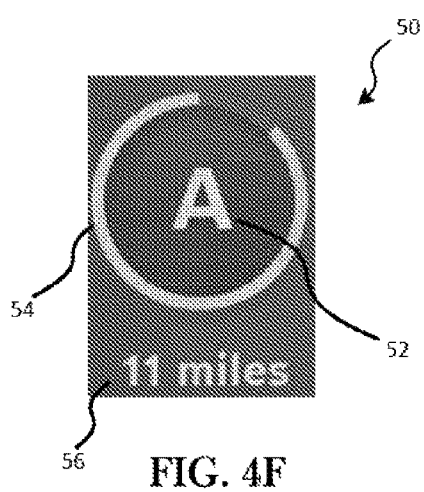

When the driver requests a mode switch, autonomous driving mode is activated, at block 112. When operating in autonomous mode (block 114) the electronic controller 12 controls the HMI 22 to display the mode and duration for the mode, using the drive state indicator 50, at block 116 (see FIG. 4F). The mode indicator 52 displays a solid letter 'A' to indicate that the vehicle is in autonomous mode. The descriptor 56 shows the duration as distance remaining until the driver reaches the point where he will regain control of the vehicle and enter manual driving mode. Similarly, the duration indicator 54 graphically represents the duration as a circular progress bar, which updates based on the remaining distance. In some embodiments, the mode indicator 52, the duration indicator 54, and the descriptor 56 may be displayed in a second color (e.g., blue) to indicate autonomous driving mode.

Because the driver is able to engage in non-driving tasks while being driver in autonomous driving mode, the driver may need to be alerted that the autonomous driving mode will be ending. Accordingly, at block 118, the electronic controller 12 determines whether a duration threshold has been met. The duration threshold represents some amount of time (e.g., three minutes) or distance (e.g., two miles) remaining in the autonomous portion of the trip. In the example illustrated, the duration threshold is two miles.

Figure 4G:
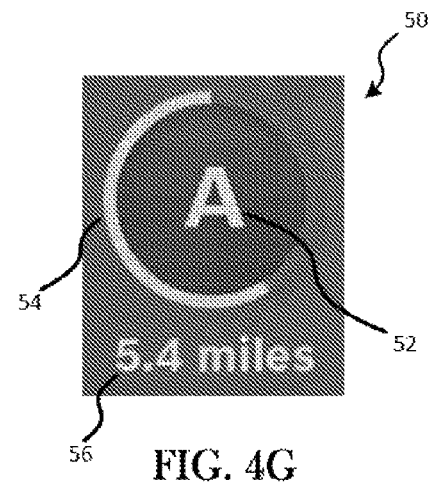

When the duration threshold has not been met, the electronic controller 12 controls the HMI 22 to continue to display the mode and duration, at block 116. For example, the mode indicator 52 continues to display a solid letter 'A' to indicate that the vehicle is in autonomous mode (see FIG. 4G). The duration indicator 54 continues to update based on the remaining distance, and the descriptor 56 displays a message including the remaining distance (e.g., as illustrated, '5.4 miles').

Figure 4H:
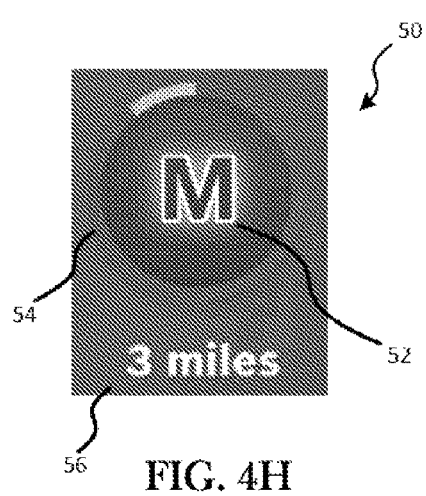

When the duration threshold has been met, the electronic controller 12 controls the HMI 22 to display the available mode, at block 120. For example, the mode indicator 52 is changed to display a letter 'M' in outline form to indicate that autonomous mode is ending soon and manual mode is available to the driver (see FIG. 4H). In the illustrated example, the mode indicator 52 is displayed with a glowing light emanating from the letter 'M' to further highlight that the driver will soon need to enter manual driving mode. Some embodiments may include a flashing or pulsating light in the mode indicator 52, or may omit this light. The duration indicator 54 continues to update based on the remaining distance, and the descriptor 56 displays a message including the remaining distance (e.g., as illustrated, '5.4 miles'). In embodiments where color is also used to indicate the driving mode, the mode indicator 52 may be changed from the second color to the first color (e.g., white), which is used to indicate the manual driving mode, to further highlight the driver will soon enter manual driving mode.

Figure 4I:
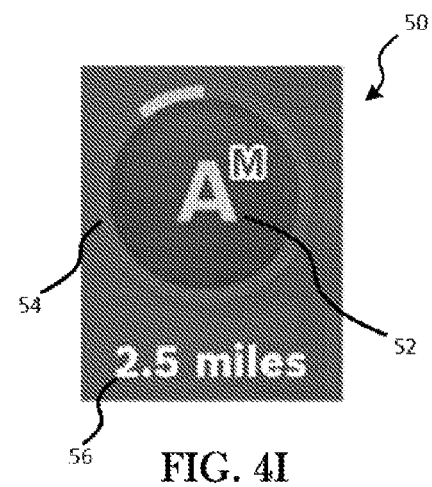

At block 122, the electronic controller 12 determines whether a mode switch has been requested by the driver. For example, the electronic controller 12, via the HMI 22, may receive an input from the driver confirming that the driver would like to enter manual mode. When the driver requests a mode switch, manual driving mode is activated, at block 124. At block 126, when no input has been received, the electronic controller 12 controls the HMI 22 to continue to display the available mode along with the current operating mode (see FIG. 4I). For example, the mode indicator 52 includes a solid letter 'A' to indicate that the vehicle is in autonomous mode and a superscripted outlined 'M' to indicate that manual mode is available. The duration indicator 54 indicates the remaining distance in the current autonomous portion of the trip, and updates based on the remaining distance. The descriptor 56 displays a message including the remaining distance for the autonomous portion of the trip (e.g., as illustrated, '2.5 miles').

Figure 4J:
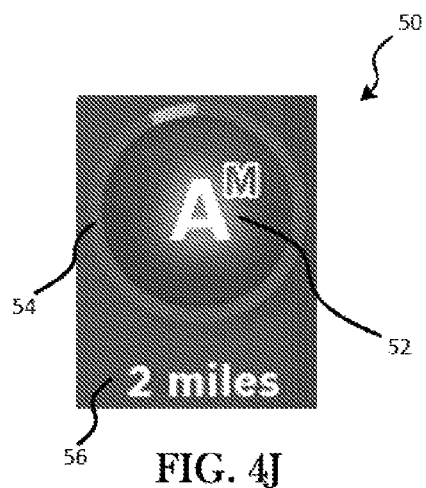

In embodiments where color is also used to indicate the driving mode, the mode indicator 52 may be changed from the second color to the first color (e.g., white), which is used to indicate the manual driving mode, to further highlight the driver will soon need to enter manual driving mode. In alternative embodiments, for example, as illustrated in FIG. 4J, the mode indicator 52 may be displayed in a third color (e.g., orange) with a glowing or pulsating light to further highlight the driver will soon need to enter manual driving mode. Some embodiments may also display the duration indicator 54 in the third color.

Returning to FIG. 3, at block 128, the electronic controller 12 determines whether a limited duration threshold has been met. The limited duration threshold represents some amount of time (e.g., three minutes) or distance (e.g., two miles) remaining in the autonomous portion of the trip. The limited duration threshold is generally lesser than the duration threshold of block 118, and is set to indicate that the autonomous portion of the trip is nearly complete. In the example illustrated, the limited duration threshold is one minute. When the limited duration threshold has not been met, the electronic controller 12 controls the HMI 22 to continue to display the mode and duration, at block 126.

Figure 4K:
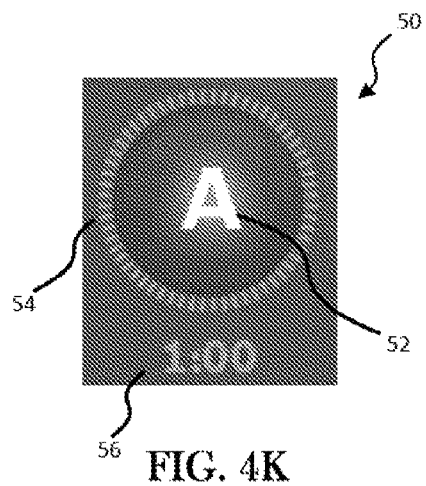

When the limited duration threshold has been met, the electronic controller 12 controls the HMI 22 to display a countdown to the end of the autonomous portion of the trip, at block 120. For example, the mode indicator 52 is changed to display an 'A' in a fourth color (e.g., red) with a glowing light emanating from the 'A' to indicate that autonomous mode is ending within one minute (see FIG. 4K). Some embodiments may include a flashing or pulsating light in the mode indicator 52, or may omit this light. The duration indicator 54 changes from a continuous progress bar to a segmented progress bar with sixty segments (e.g., hash marks), one for each of the remaining sixty seconds in the autonomous mode. As the duration decreases, one segment is removed for each second that has passed. In some embodiments, the segments are displayed in the same fourth color as the mode indicator 52. The descriptor 56 is changed to indicate the time remaining for autonomous driving mode (e.g., as illustrated, '1:00').

Figure 4L:
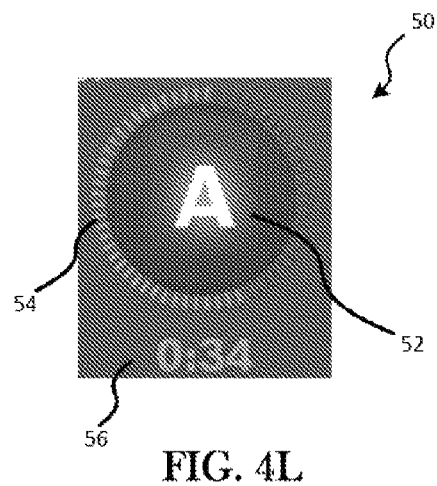
Figure 4M:
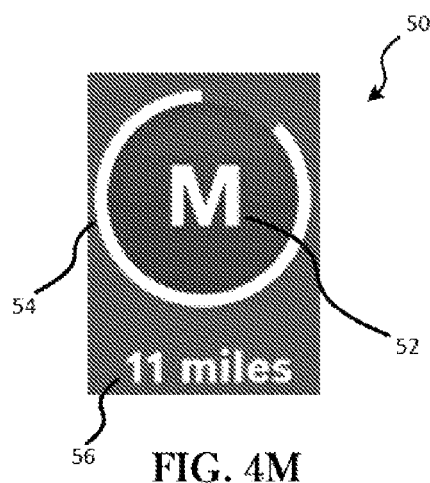
Figure 4N:
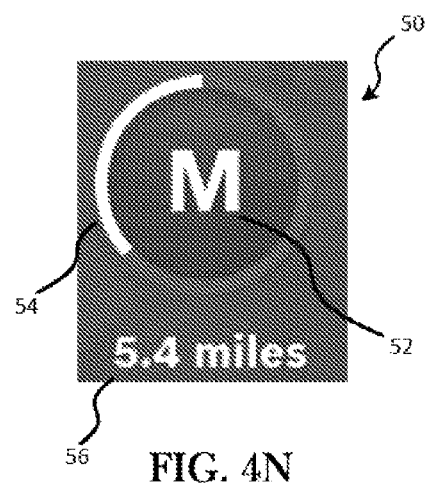

At block 132, the electronic controller 12 determines whether a mode switch has been requested by the driver. When no input has been received, the electronic controller 12 controls the HMI 22 to continue to display the available mode along with the current operating mode at block 130. The electronic controller 12 controls the HMI 22 to continuously update the drive state indicator 50 as the duration decreases (see FIG. 4L).

When the driver requests a mode switch, manual driving mode is activated, at block 124. At block 134, the electronic controller 12 controls the HMI 22 to display the mode and duration for the second manual portion of the trip (see FIGS. 4B and 4C) until the trip has ended (i.e., the destination has been reached), and the vehicle re-enters manual mode driving at block 136.

Thus, the invention provides, among other things, a drive state indicator for an autonomous vehicle. Various features and advantages of the invention are set forth in the following claims.

What is claimed is:

1. A system for indicating the drive state of an autonomous vehicle, the system comprising:
   a human machine interface; and
   an electronic controller, electrically coupled to the human machine interface and configured to
      display, via the human machine interface, a drive state indicator, the drive state indicator including
         a mode indicator based on a current operating mode for the autonomous vehicle, the current operating mode being one selected from a group consisting of an autonomous driving mode and a manual driving mode;
         a duration indicator based on a duration for the current operating mode;
         a descriptor based on the duration;
      update the duration indicator and the descriptor based on a remainder of the duration;
      determine, while in the current operating mode, whether a second operating mode is available; and
      when the second operating mode is available, display, while in the current operating mode, a second mode indicator within the drive state indicator, the second mode indicator based on the second operating mode and indicating that the second operating mode is available.

2. The system of claim 1, wherein the mode indicator includes a solid letter.

3. The system of claim 1, wherein the duration indicator includes a circular progress bar surrounding the mode indicator.

4. The system of claim 1, wherein the descriptor includes at least one text-based message.

5. The system of claim 1, wherein the second operating mode is one selected from a group consisting of an autonomous driving mode and a manual driving mode.

6. The system of claim 1, wherein the second mode indicator includes an outlined letter.

7. The system of claim 1, wherein the second mode indicator includes a solid letter and an outlined letter.

8. The system of claim 1, wherein the electronic controller is further configured to
   receive a signal from the human machine interface indicating a request to activate the second operating mode;
   activate the second operating mode in response to the request;
   display a second mode indicator based on the second operating mode;
   display a second duration indicator based on a second duration for the second operating mode;
   display a second descriptor based on the second duration; and
   update the second duration indicator and the descriptor based on a second remainder of the second duration.

9. The system of claim 1, wherein the electronic controller is further configured to
   display the second mode indicator, a second duration indicator, and a second descriptor when the remainder meets a threshold.

10. The system of claim 9, wherein the second duration indicator includes a plurality of hash marks denoting the remainder; and
   wherein the electronic controller is further configured to update the second duration indicator based on the remainder.

11. A method for operating an autonomous vehicle, the method comprising:
   displaying, via a human machine interface of the autonomous vehicle, a mode indicator based on a current operating mode for the autonomous vehicle, the current operating mode being one selected from a group consisting of an autonomous driving mode and a manual driving mode;
   displaying, via the human machine interface, a duration indicator based on a duration for the current operating mode;
   displaying, via the human machine interface, a descriptor based on the duration;
   updating, by an electronic controller of the autonomous vehicle, the duration indicator and the descriptor based on a remainder of the duration;
   determining, by the electronic controller, while in the current operating mode, whether a second operating mode is available; and displaying, via the human machine interface, while in the current operating mode, a second mode indicator within the drive state indicator, the second mode indicator based on the second operating mode and indicating that the second operating mode is available within the drive state indicator.

12. The method of claim 11, wherein displaying the second mode indicator includes displaying the second mode indicator based on one selected from a group consisting of an autonomous driving mode and a manual driving mode.

13. The method of claim 11, further comprising:
receiving, by the electronic controller, a signal from the human machine interface indicating a request to activate the second operating mode;
activating, by the electronic controller, the second operating mode in response to the request;
displaying, via the human machine interface, the second mode indicator based on the second operating mode;
displaying, via the human machine interface, a second duration indicator based on a second duration for the second operating mode;
displaying, via the human machine interface, a second descriptor based on the second duration; and
updating, by the electronic controller, the second duration indicator and the descriptor based on a second remainder of the second duration.

14. The method of claim 11, further comprising:
displaying, via the human machine interface, the second mode indicator, a second duration indicator, and a second descriptor when the remainder meets a threshold.

15. The method of claim 11, further comprising:
updating, by the electronic controller, the second duration based on a the remainder; and
wherein displaying the second duration indicator includes displaying the second duration indicator with a plurality of hash marks denoting the remainder.

* * * * *